United States Patent [19]

Tuot

[11] Patent Number: 5,460,029

[45] Date of Patent: Oct. 24, 1995

[54] AUTOMATIC TESTER AND CALIBRATOR FOR INSTRUMENTS OR FLUID METERS

[76] Inventor: Neat Tuot, 167 Dover Meadow Close S.E., Calgary, Alberta, Canada, T2B 2E4

[21] Appl. No.: 69,372

[22] Filed: Jun. 1, 1993

[51] Int. Cl.⁶ .................................................. G01F 25/00
[52] U.S. Cl. ........................................................... 73/3
[58] Field of Search ...................................... 73/3

[56] References Cited

U.S. PATENT DOCUMENTS

| | | | |
|---|---|---|---|
| 3,439,538 | 4/1969 | Forrell | 73/3 X |
| 3,517,308 | 6/1970 | Mirdadian | 73/3 X |
| 3,595,081 | 7/1971 | Byers | 73/3 X |
| 3,831,429 | 8/1974 | Kniecik | 73/1 H |
| 3,958,443 | 5/1976 | Berrettini | 73/3 |
| 4,307,601 | 12/1981 | Jackson | 73/3 |
| 4,502,318 | 3/1985 | Converse, III et al. | 73/3 |
| 4,517,823 | 5/1985 | Bölm | 73/3 |
| 4,584,864 | 4/1986 | Neeff | 73/3 |
| 4,591,093 | 5/1986 | Elliot, Jr. | 73/3 X |
| 4,619,134 | 10/1986 | Böhm et al. | 73/3 |

OTHER PUBLICATIONS

Mercury Instruments, Inc. Product Brochure entitled "2020 MB Calibrated Torque Tester/Motorized Base", 1987, 1 page.

Mercury Instruments, Inc. General Catalog, 1987, 7 pages.

*Primary Examiner*—Thomas P. Noland
*Attorney, Agent, or Firm*—Anthony R. Lambert

[57] ABSTRACT

A mechanical tester for instrument for fluid meters, commonly known as an instrument tester, a motorized base, a turntable, or an instrument drive simulator, consists of an electric motor, a set of pulleys and a preset counter. Its usefulness is limited to causing the instrument driving mechanism, thus the instrument under test, to travel a predetermined number of revolutions and in a predetermined direction. It has no provision for receiving and making use of the feedbacks directly from the instrument under test. The automatic instrument tester and calibrator provides for the monitor of events and conditions which directly or indirectly affect the accuracy of the instrument under test thus reducing the elements of uncertainty in the instrument calibrating process. The automatic instrument tester and calibrator further provides for the computation of the instrument's error and for storing the test data for further processing and retrieval thus reducing error, calibrating time, and thus reducing operating cost.

9 Claims, 6 Drawing Sheets

AUTOMATIC TESTER AND CALIBRATOR FOR INSTRUMENTS OR FLUID METERS

FIELD OF THE INVENTION

The present invention relates to testing and calibration devices for primary metering devices that register the volume of fluid flowing through a pipeline.

CLAIM TO COPYRIGHT

A portion of the disclosure of this patent document contains material which is subject to copyright protection. The copyright owner has no objection to the facsimile reproduction by anyone of the patent document, as it appears in the Patent and Trademark Office patent file or records, but otherwise reserves all copyright rights whatsoever.

BACKGROUND AND SUMMARY OF THE INVENTION

It is common in testing devices used for the testing and calibration of instruments such as flow volume integrators and pressure and temperature chart recorders for the motor of the testing device to rotate a number of revolutions thus causing the instrument's shaft to rotate an equal or a proportional number of revolutions, either in clockwise or counter-clockwise direction. Furthermore the testing device may be equipped with a device to indicate the resistance caused by the instrument's shaft relative to the free running of the motor when not under any load.

Devices of this type perform only two functions—to simulate the rotation of a meter instrument drive and to indicate the level of drag caused on or by the instrument's shaft and they are inefficient, error prone and very unreliable because:

(1) the counter of the testing device keeps track of the number of revolutions travelled by the motor shaft only but not that of the instrument under test;

(2) there is no means to verify the integrity of the flow sensing switches in electromechanical or electronic instruments while the testing device is running;

(3) there is no means to verify if the correct number of electrical impulses are transmitted to and received by the instrument under test. These factors directly affect the registration of the instrument under test, thus its accuracy. They are, moreover, not suitable for automatic operation because they do not have any provision for such operation or necessary interface(s) to a computer.

They cannot perform any diagnostic tests other than for the drag of the instrument's shaft. Also, all data have to be transcribed manually, the instrument's error computations have to be done manually and no data storage and retrieval capability is provided for.

The use of data obtained by using these devices to evaluate the performance of the instrument under test requires a number of assumptions which are sometimes erroneous. The results obtained are, therefore, unreliable.

The above disadvantages are overcome by the automatic testing and calibrating system of the present invention which provides in various aspects of the invention for (1) continuous monitoring of flow volume sensing switch(es), 2) continuous monitoring of electrical impulses transmitted by the flow sensing switch(es), (3) continuous monitoring of electrical impulses the instrument receives from the flow sensing switch(es), (4) continuous monitoring of other parameters such as pressure and temperature, etc., (5) continuous monitoring the electrical impulses representing the uncorrected volume simulated by the system, (6) continuous monitoring the electrical impulses representing the uncorrected flow volume received and registered by the instrument, (7) continuous monitoring the electrical impulses representing the corrected flow volume computed, registered and displayed by the instrument, (8) computing for the referenced corrected flow volume using an industry standard flow volume equation applicable to the fluid to be measured and the primary measuring device used, (9) comparing the corrected volume as registered by the instrument to the referenced corrected volume as computed by the system to determine the instrument's error thereby improving test reliability, and assuring data integrity and reducing instrument verifying and calibrating time and cost, whilst it is also portable.

Thus according to the present invention, there is provided a system for verification of instruments used on meters to measure fluid passing through a pipeline, said system comprising:

a stepping motor which, when rotated, drives a drive dog which in turn drives the instrument's shaft or activates one or more proximity sensing switch(es) whose electrical impulse represents a certain volume of fluid flowing through the pipeline; a stepping motor driver; a computer interface allowing the computer to control the stepping motor driver; and physical means for the computer to receive electrical impulses representing various measurement parameters back from the instrument.

In another embodiment of the invention there is provided a method for calibrating and adjusting a fluid flow measuring device having flow sensing switches and having means to generate first electrical signals representative of fluid flow, the method comprising controllably and forcibly driving the flow sensing switches of the measuring device in a manner corresponding to a reference volume of flow, producing second electrical signals representative of the reference volume, receiving and processing the first electrical signals from the measuring device to produce a corrected or uncorrected volume signal, comparing the corrected or uncorrected volume signal to the reference volume signal and producing output representative of the comparison; and adjusting the flow measuring device using the output.

Further elucidation of the invention is set out in the description that follows and most particularly in the claims that follow the description.

BRIEF DESCRIPTION OF THE DRAWINGS

In drawings which illustrate embodiments of the invention.

A copy of the software used to program a general purpose computer according to the principles of the invention is attached hereto as schedule A.

DETAILED DESCRIPTION OF A PREFERRED EMBODIMENT OF THE INVENTION

Figure 1:
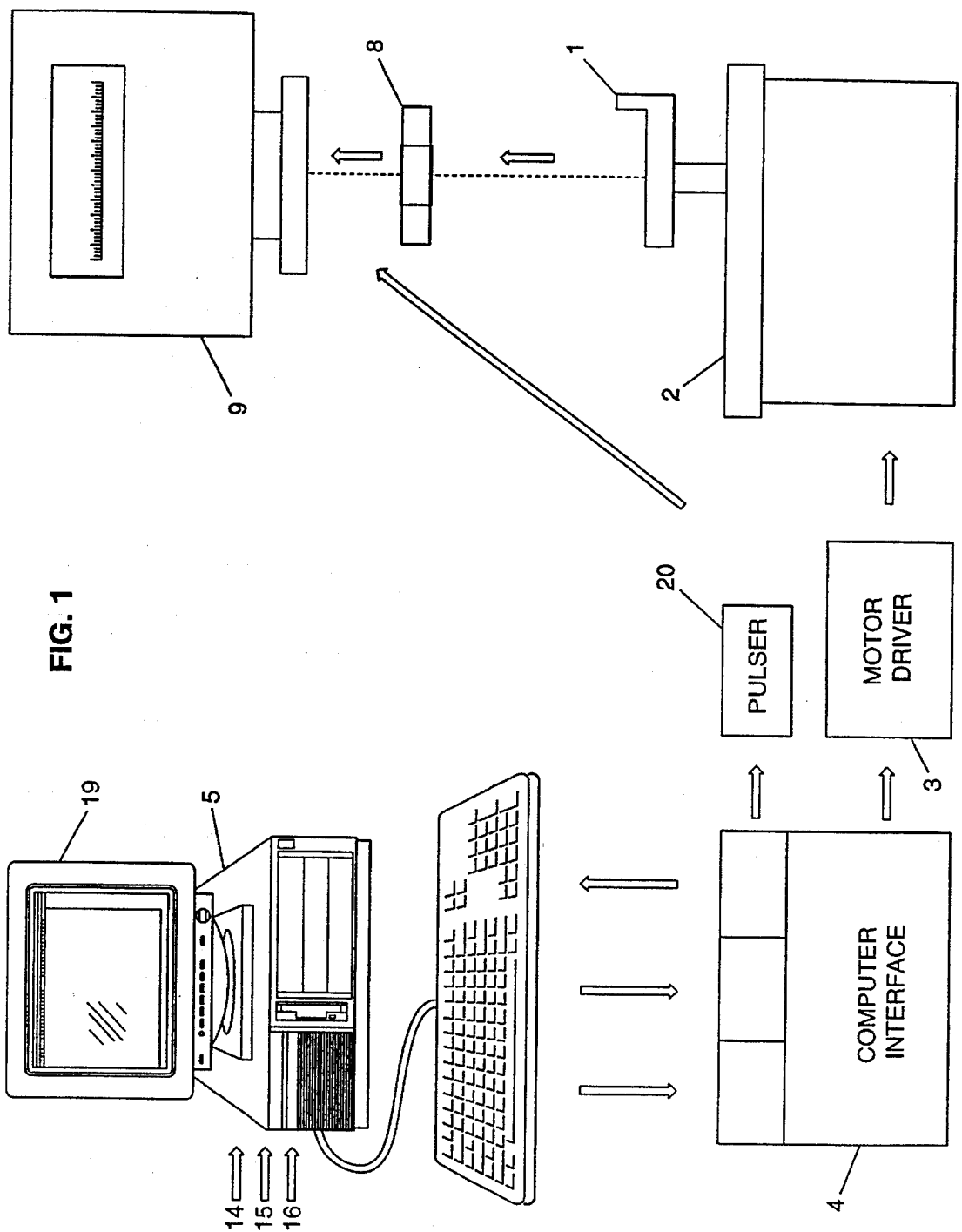
FIG. 1 is a block diagram illustrating the hardware and peripherals in the invention.
Figure 2:
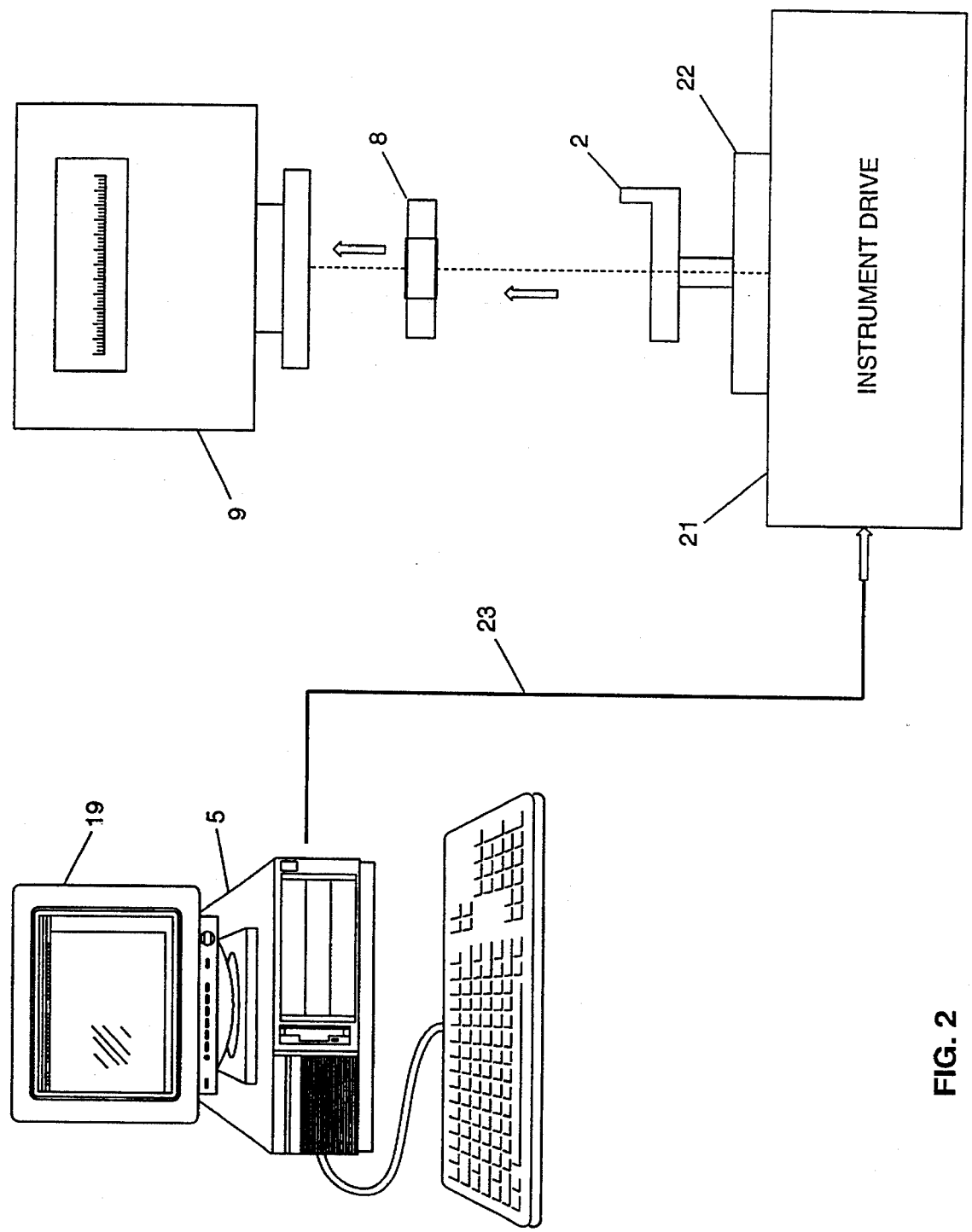
FIG. 2 is a block diagram illustrating the wiring for the system control.
Figure 3:
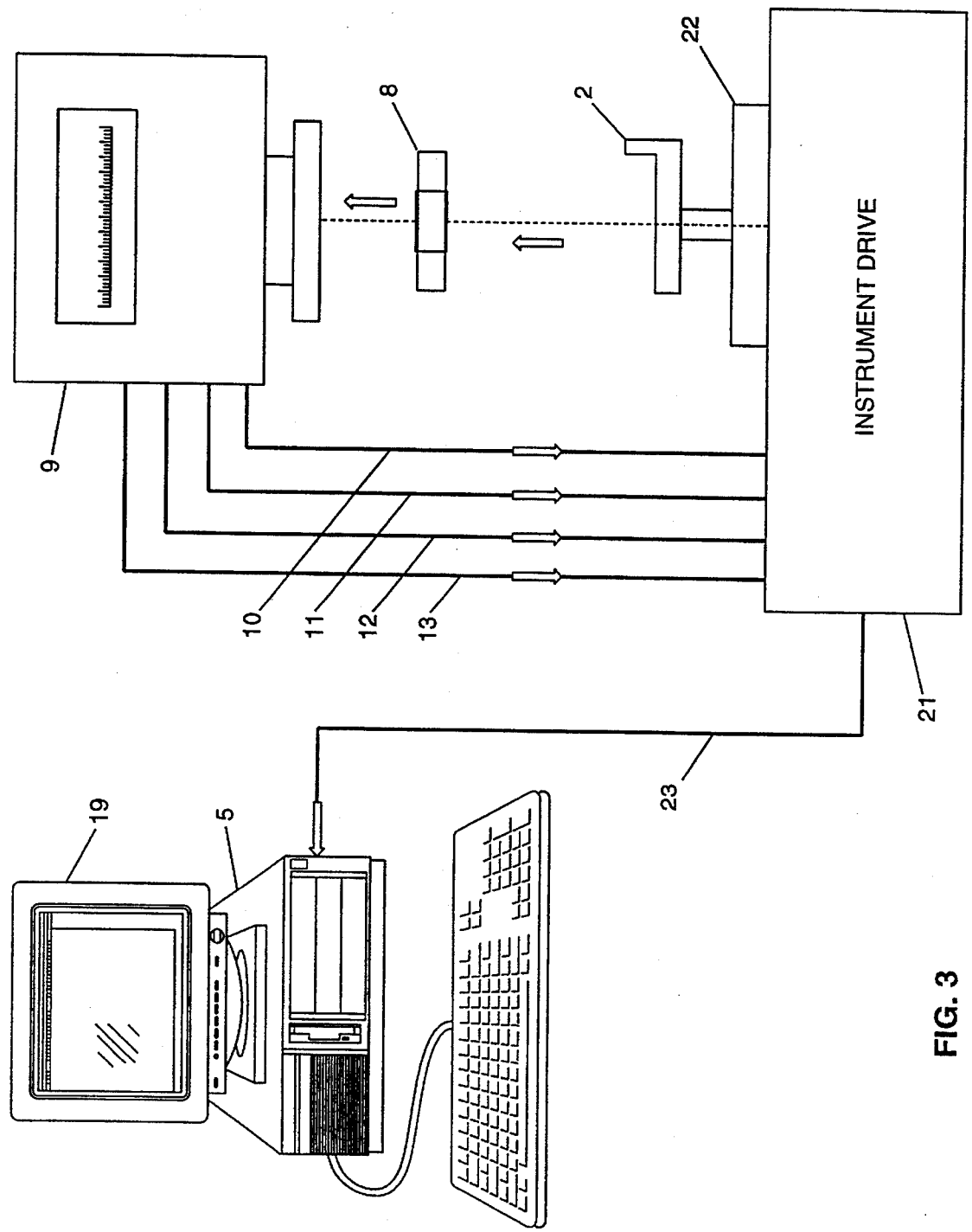
FIG. 3 is a block diagram illustrating the wiring for the data acquisition.
Figure 4:
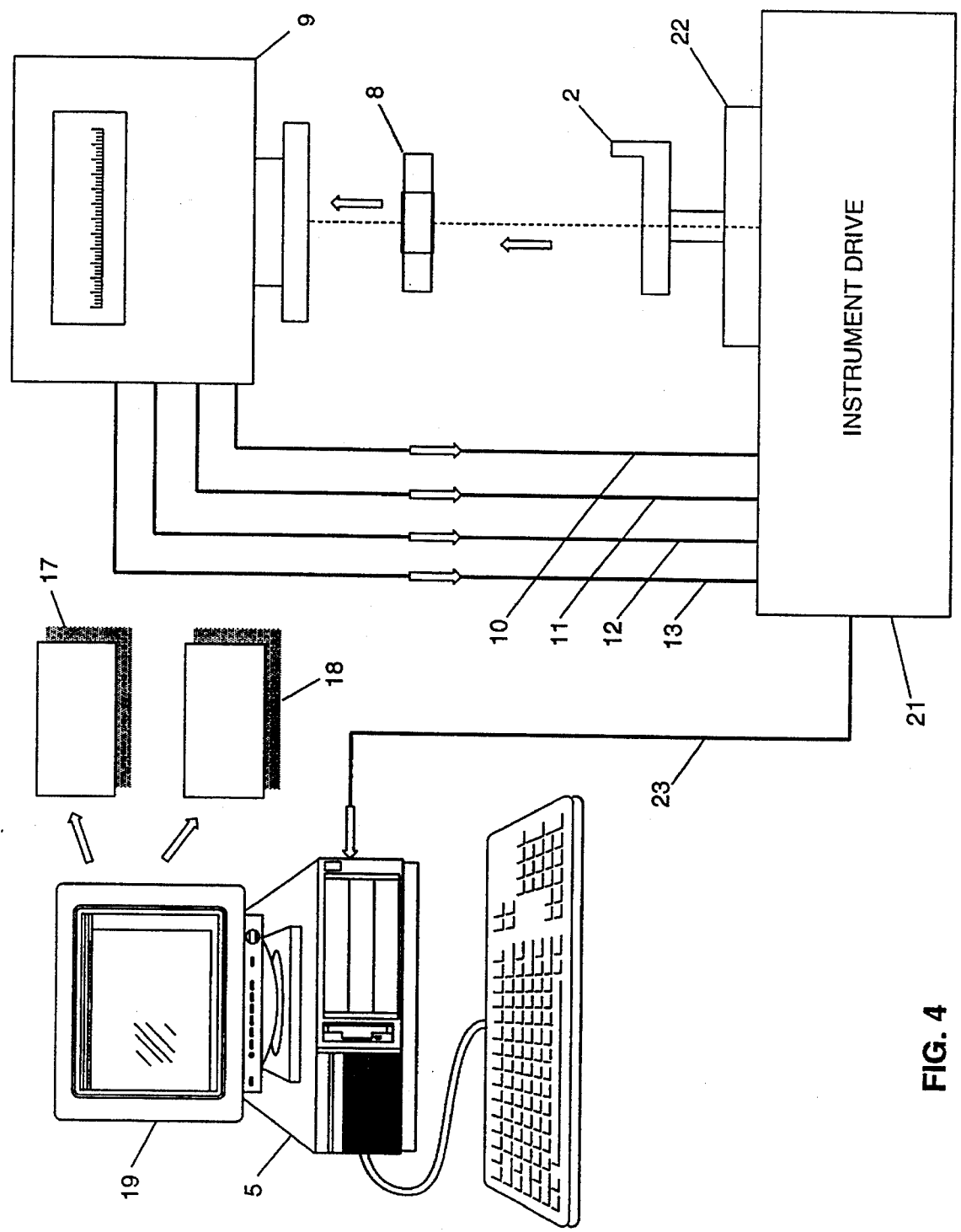
FIG. 4 is a block diagram illustrating the test report.

References are made now to FIGS. 1, 2 and 3, the automatic instrument tester and calibrator comprises an instrument driving mechanism commonly known as a drive dog 1 which is driven by a stepping motor 2, a stepping motor driver 3 operatively connected in known manner to the stepping motor 2 and a computer interface 4 to allow a computer 5 to control the stepping motor driver 3 and to collect and process data. Links between the instruments are provided by conductors or means 10 to connect electrically flow sensing switch(es) 8 of an instrument 9 undergoing a test to the computer 5 as well as conductors 11, 12 and 13, that respectively connect the instrument 9 under test to the computer 5 allowing the computer to monitor the electrical impulses representing the fluid uncorrected flow volume 11 passing through the pipeline the instrument receives (which impulses come directly from the flow sensing switches), and the uncorrected volume 12 and the corrected volume 13 the instrument 9 accumulates and calculates during the test. The computer 5 can be a stand alone computer programmed in accordance with the software attached hereto or an embedded computer into the same enclosure for the stepping motor and/or the driver of the motor, with or without a built-in video monitor. The drive dog 1 preferably includes a magnet, which when it rotates, successively operates the flow sensing switches 8 on the flow measuring device. The impeller is removed so that the switches can be operated by the drive dog. There may be one or more flow sensing switches depending on the type of flow measuring device being tested. Thus, depending on the number of switches there will be one or more pulses per revolution of the drive dog.

The automatic instrument tester and calibrator also has a built-in pulser 20 in order to facilitate the calibration of an instrument 9 which does not have its own flow sensing switch(es) 8. Operation of the pulser 20 is explained in more detail below.

The computer 5 also accepts inputs for reference from a temperature sensor 14, a pressure transducer/transmitter 15 and other devices 16 capable of producing outputs that the computer 5 uses to determine the reference flow volume of the fluid.

The reference flow volume $V_{ref}$ is defined as:

$$V_{ref} = V_i \times f(t) \times f(p) \times f(x) \qquad \text{(Equation 1)}$$

where $$V_i = N \times I \times V_p$$

N=Number of revolutions the drive dog travels;

I=Number of electrical impulses the instrument receives when the drive dog makes one revolution;

Vp=Uncorrected volume per revolution of drive dog f(t)=Temperature Factor =Base Temperature/Fluid Flowing Temperature (Equation 1a)

f(p)=Pressure Factor =Fluid Metering Pressure/Base Pressure (Equation 1b)

f(x)=Supercompressibility Factor as detailed in AGA-3 NX-19.

The test results, namely instrument's error 17 and the flow sensing switches' status 18 along with other test data and parameters are displayed on the video monitor 19 or printed on a printer in the form of test report. The test results may then be used to adjust the flow measuring instrument in accordance with known practice. The instrument's error 17 is defined as:

$$\text{Error} = ((V_{in} - V_{ref})/V_{ref}) \times 100 \qquad \text{(Equation 2)}$$

where $V_{in}$=Corrected Volume as computed and registered by the instrument $V_{ref}$=Reference Corrected Volume as computed by Equation 1.

The stepping motor 2, the motor driver 3 and the computer interface 4 are normally, but not necessarily, enclosed in a common housing while the drive dog 1 is coupled to the shaft of the motor 2. These devices taken together, with or without a common housing, will be referred to as instrument drive 21.

The instrument drive 21 is controlled by the computer 5 via its parallel port through the cable 23. The computer 5 receives data (in the form of electrical signals) from the instrument under test 9 via its parallel port and through the same cable 23. When the computer 5 instructs the drive means to rotate the stepping motor 2 a chosen number of (or fraction of) revolutions, it generates electrical signals that are representative of a reference volume. This reference volume may be corrected for pressure and temperature effects by using the inputs from devices 14 and 15 to produce a signal representing a corrected reference volume, in the case of the temperature sensor, the reference flow volume will be corrected for temperature.

To set up an instrument for testing:

(1) The instrument to be tested and calibrated 9 is placed securely on an instrument adaptor plate 22 forming part of the testing device;

2) One end of cable 23 is connected to the instrument drive 21 and the other end to a parallel port of the computer 5;

(3) One end each of cable 24 and 25 is connected to the instrument drive 21 and lead 10, lead 11, lead 12 and lead 13 are connected to the instrument's sensing switch output, uncorrected volume input, uncorrected volume output and corrected volume output respectively;

(4) The computer 5 is run using software designed for the purpose (the design of which is well within the capability of a person skilled in the art from the description in this disclosure, or which may be obtained from Sigma Measurement & Process Control Ltd. of Calgary, Alberta, Canada) and the instrument testing and calibrating process begins. All ground leads must be connected to their respective signal grounds.

Figure 5:
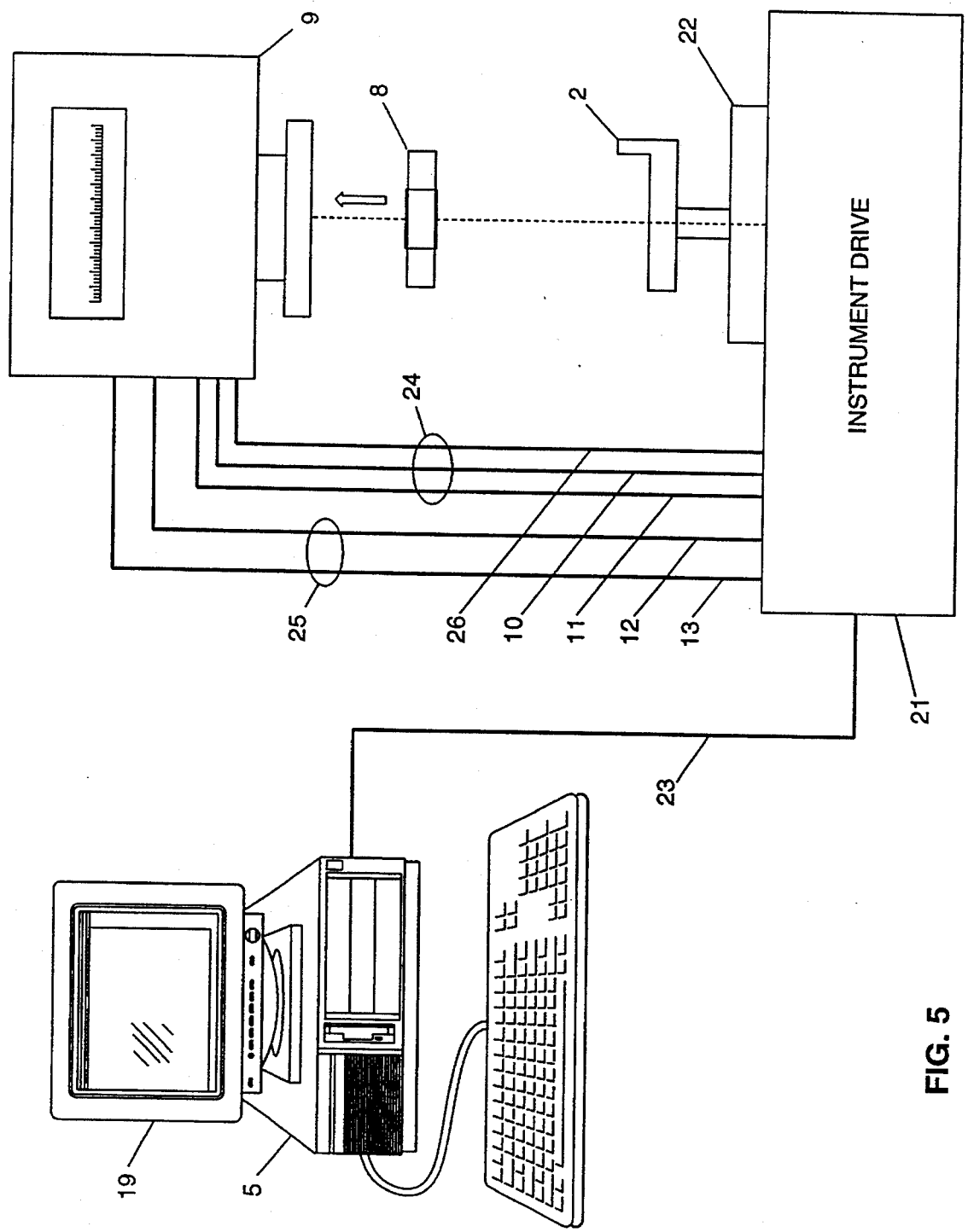
FIG. 5 is a block diagram illustrating the instrument test setup.
Figure 6:
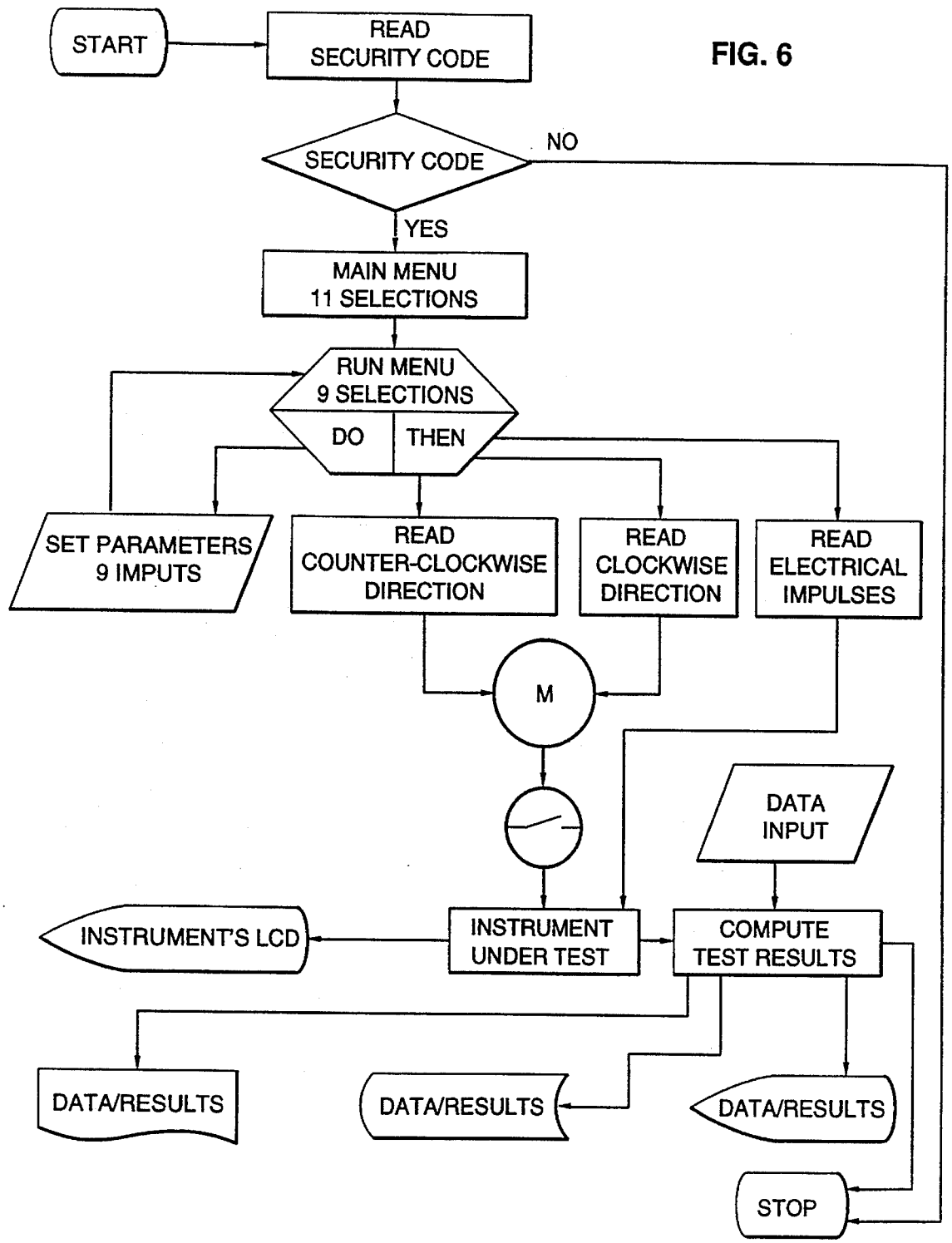
FIG. 6 is a flowchart diagram illustrating the operation of the system.

Operation of the present automatic instrument tester and calibrator will now be explained in detail with reference to FIGS. 5 and 6. It will be appreciated that the present automatic instrument tester and calibrator enables verification of the instrument's accuracy, the proper operation of its flow sensing switch(es) and reports on the test results.

After start-up, the system is ready for instrument testing. The instrument drive is set to run in a chosen direction and make as many revolutions and/or steps as selected and as entered in, for example if desired, a parameter setting menu. During this time the computer preferably monitors the status of the flow sensing switch(es), for example whether they are on or off and when they are on and off, the electrical impulses representing the uncorrected volume the instrument receives and the electrical impulses representing the uncorrected and corrected volumes the instrument transmits.

Additional test parameters namely, volume per revolution, average metering pressure, average metering temperature, base pressure, base temperature, specific gravity, atmospheric pressure, $CO_2$ and $N_2$ contents are also preferably monitored by the computer. When the instrument drive stops and when desired parameters have been stored in the computer, calculations as described earlier may be made and the test results may be displayed for viewing on the computer monitor, printed on a printer or saved to a disk for later retrieval. When viewed on the computer monitor the following are preferably displayed: pressure factor f(p)—Equation 1b, temperature factor f(t)—Equation 1a, Supercompressibility factor (f(x)), combined correction factors—f(p)× f(t)×f(x), reference uncorrected volume, reference corrected volume and instrument's error are displayed. On a hard copy, these test results are printed along with all the test parameters. Once the test results have been obtained, the measuring device may be adjusted in known manner.

Alternately, if the user wishes to bypass the flow sensing switch(es) or if the instrument to be tested does not have a flow sensing switch of its own, the electrical impulses obtained through pulser 20 can be connected by means of lead 26 to the sensing switch's output connector. As in the instrument drive method described above, after the start-up of the computer and any desired security handshake between the software and the hardware has been established, the system is ready for instrument testing.

However, here the instrument 9 will receive the electrical impulses from the pulser 20 instead of from flow sensing switch(es) 8. The instrument receives these electrical impulses until the number of pulses generated reaches a preset number entered in the computer, as for example in a parameter setting menu. During this time the computer preferably monitors only the following: the electrical impulses representing the uncorrected volume the instrument receives, the electrical impulses representing the uncorrected and corrected volumes the instrument transmits. As in the instrument drive method described above, when the testing process stops and when all additional test parameters namely, volume per revolution, average metering pressure, average metering temperature, base pressure, base temperature, specific gravity, atmospheric pressure, $CO_2$ and $N_2$ contents have been monitored and stored as desired, the test results may be displayed on the computer monitor, printed on a printer or saved to a disk for later retrieval.

The computer may be any general purpose computer or PC programmed as indicated in this disclosure. The drive dog, stepping motor, connections, the drive for the stepping motor and the computer interface are also all well known in the art and need not be further described here.

The embodiments of the invention in which an exclusive property or privilege is claimed are defined as follows:

1. An instrument calibrator for a fluid flow measuring device, the measuring device having flow sensing switches and having means to generate first electrical signals representative of fluid flow, the calibrator comprising:

drive means for controllably and forcibly switching the switches successively in a manner corresponding to a chosen reference volume of fluid flow;

means for producing second electrical signals representative of the chosen reference volume;

means for receiving and processing the first electrical signals from the measuring device to produce a measured volume signal;

means for comparing the measured volume signal to the second electrical signals representative of the chosen reference volume and producing output representative of the comparison; and means for adjusting the flow measuring device using the output.

2. The instrument calibrator of claim 1 in which:

the means for producing second electrical signals includes rotary flow sensing switches; and the drive means includes a stepping motor capable of rotating the rotary flow sensing means a fraction of a revolution.

3. The instrument calibrator of claim 1 further including means to monitor the flow sensing switches.

4. The instrument calibrator of claim 1 in which the flow measuring device includes a temperature sensor and further including means to monitor the temperature sensor and to process the reference volume signal and produce a temperature corrected reference volume signal.

5. The instrument calibrator of claim 1 in which the flow measuring device includes a pressure transducer and further including means to monitor the pressure transducer and to process the reference volume signal and produce a pressure corrected reference volume signal.

6. A method for calibrating a fluid flow measuring device, the measuring device having flow sensing switches and having means to generate first electrical signals representative of fluid flow, the method comprising:

controllably and forcibly switching the switches successively in a manner corresponding to a chosen volume of fluid flow;

producing second electrical signals representative of the chosen reference volume;

receiving and processing the first electrical signals from the measuring device to produce a measured volume signal;

comparing the measured volume signal to the reference volume signal and producing output representative of the comparison; and adjusting the flow measuring device using the output.

7. The method of claim 6 in which the flow measuring device includes flow sensing switches and further including monitoring the flow sensing switches.

8. The method of claim 6 in which the flow measuring device includes a temperature sensor and further including monitoring the temperature sensor and processing the reference volume signal to produce a temperature corrected reference volume signal.

9. The method of claim 6 in which the flow measuring device includes a pressure transducer and further including monitoring the pressure transducer and processing the reference volume signal to produce a pressure corrected reference volume signal.

* * * * *